United States Patent
Selinka et al.

(10) Patent No.: US 8,770,362 B2
(45) Date of Patent: Jul. 8, 2014

(54) HYDRODYNAMIC RETARDER

(75) Inventors: Christian Selinka, Poppenhausen (DE);
Reinhold Mayer, Ravensburg (DE);
Thomas Meid, Deggenhausertal (DE);
Dirk Huhn, Friedrichshafen (DE);
Michael Ptock,
Schonungen-Waldsachsen (DE);
Michael Huber, Langenargen (DE)

(73) Assignee: ZF Friedrichshafen AG,
Friedrichshafen (DE)

(*) Notice: Subject to any disclaimer, the term of this patent is extended or adjusted under 35 U.S.C. 154(b) by 553 days.

(21) Appl. No.: 12/602,558

(22) PCT Filed: May 19, 2008

(86) PCT No.: PCT/EP2008/056089
§ 371 (c)(1),
(2), (4) Date: Jan. 12, 2010

(87) PCT Pub. No.: WO2008/145548
PCT Pub. Date: Dec. 4, 2008

(65) Prior Publication Data
US 2010/0187058 A1    Jul. 29, 2010

(30) Foreign Application Priority Data
Jun. 1, 2007   (DE) .................. 10 2007 025 676

(51) Int. Cl.
*F16D 57/02* (2006.01)
(52) U.S. Cl.
USPC .......................................... 188/296
(58) Field of Classification Search
CPC ............................. F16D 57/005; F16D 33/20
USPC ................ 188/290–296, 274; 192/3.23, 3.34
See application file for complete search history.

(56) References Cited

U.S. PATENT DOCUMENTS

| | | | | |
|---|---|---|---|---|
| 2,205,054 A | * | 6/1940 | Wemp | 192/3.34 |
| 2,613,775 A | * | 10/1952 | Dunn | 192/219.2 |
| 2,943,516 A | * | 7/1960 | Herndon | 475/34 |
| 3,041,892 A | * | 7/1962 | Schjolin | 475/48 |
| 3,043,161 A | * | 7/1962 | Tuck | 477/59 |
| 3,130,827 A | * | 4/1964 | Beeskow | 192/13 R |
| 3,330,386 A | * | 7/1967 | Bertram et al. | 188/296 |
| 3,476,219 A | | 11/1969 | Lauer | |
| 3,774,734 A | * | 11/1973 | Forster et al. | 188/296 |
| 4,458,792 A | * | 7/1984 | Thomas et al. | 188/296 |

FOREIGN PATENT DOCUMENTS

| | | |
|---|---|---|
| DE | 11 21 841 | 5/1953 |
| DE | 20 16 711 | 10/1971 |
| DE | 21 02 078 | 7/1972 |
| DE | 3143280 | 3/1983 |

(Continued)

*Primary Examiner* — Xuan Lan Nguyen
(74) *Attorney, Agent, or Firm* — Cozen O'Connor

(57) ABSTRACT

A hydrodynamic retarder having a first blade wheel and having a second blade wheel concentric thereto, together forming a hydrodynamic circuit grouped about a common rotary axis. Each blade wheel is made of a base body and a blade arrangement fixed thereto including a plurality of blades. The hydrodynamic circuit is supplied by a fluid inlet, while the fluid removal from the hydrodynamic circuit is performed by a fluid outlet. The fluid inlet has an inlet spiral enabling tangential fluid flow and the fluid outlet has an outlet spiral enabling tangential fluid flow. At least one inlet spiral is associated with a flow guide guiding the fluid into the hydrodynamic circuit with at least one axial component.

6 Claims, 1 Drawing Sheet

(56) References Cited

FOREIGN PATENT DOCUMENTS

| | | |
|---|---|---|
| DE | 35 45 660 | 12/1985 |
| DE | 19807280 | 9/1999 |
| DE | 102 30 859 | 1/2004 |
| DE | 103 43 425 | 4/2005 |
| DE | 103 43 427 | 4/2005 |
| DE | 10 2007 025 676 | 12/2008 |
| EP | 1305535 | 4/2006 |
| GB | 1326500 | 4/1971 |
| GB | 1 391 517 | 6/1972 |
| JP | 06017858 A * | 1/1994 ............ F16D 57/02 |

* cited by examiner

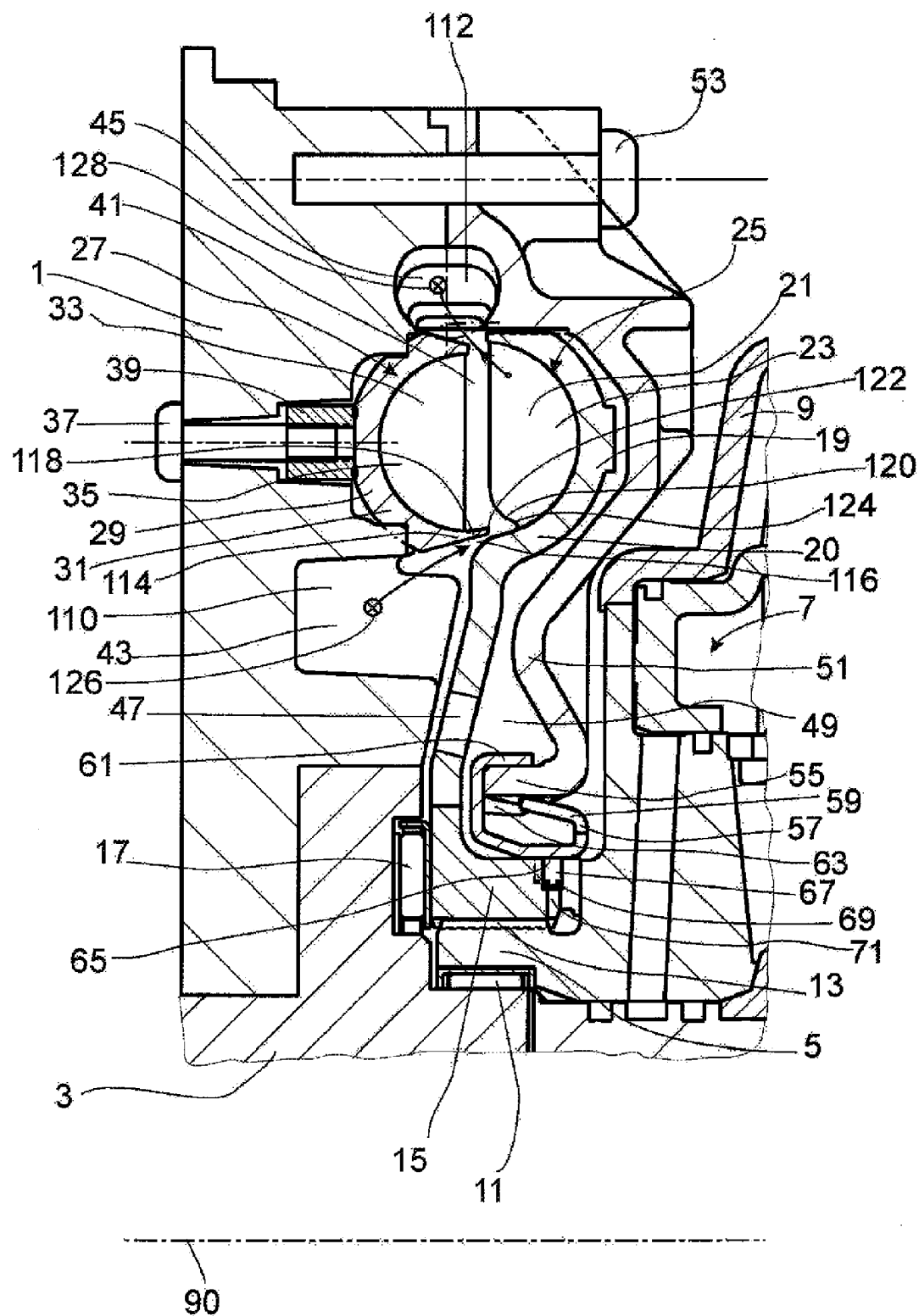

HYDRODYNAMIC RETARDER

PRIORITY CLAIM

This is a U.S. national stage of application No. PCT/EP2008/056089, filed on May 19, 2008 which claims Priority to the German Application No.: 10 2007 025 676.2, filed: Jun. 1, 2007; the contents of both being incorporated herein by reference.

BACKGROUND OF THE INVENTION

1. Field of the Invention

The invention pertains to a hydrodynamic retarder with a first blade wheel and with a second blade wheel, concentric to the first, which together form a hydrodynamic circuit and are grouped around a common axis of rotation, wherein each blade wheel consists of a base body and a blading with a plurality of blades permanently attached to the base body.

2. Prior Art

A hydrodynamic retarder with a first blade wheel, acting as a rotor blade wheel, and with a second blade wheel, concentric to the first, acting as a stator blade wheel, is known from EP 1 305 535 B1. These two blade wheels together form a hydrodynamic circuit and are grouped around a common axis of rotation, wherein each blade wheel consists of a base body and a blading with a plurality of blades permanently attached to the base body. Fluid is supplied to the hydrodynamic circuit through a fluid inlet, and fluid is discharged from the hydrodynamic circuit through a fluid outlet.

Retarders of this type suffer from the basic problem that cavitation can occur as a result of the high-speed infeed of fresh fluid into the hydrodynamic circuit. This cavitation can cause damage to the blading of the stator blade wheel, usually in the radially outer area of the blades. For this reason, all of the blades on the stator blade wheel have a bevel in the radially outer area, extending back from the flow edge, i.e., the edge which faces the rotor blade wheel. Nevertheless, this solution merely limits the effects of cavitation; it does nothing to prevent its occurrence.

SUMMARY OF THE INVENTION

The invention is based on the goal of designing the fluid inlet in a hydrodynamic retarder in such a way that cavitation-caused damage to the blading of at least one blade wheel can be at least largely avoided.

By designing the fluid inlet with an inlet spiral, the fluid begins to flow in an essentially tangential direction just before it enters the hydrodynamic circuit. Because of the flow guide assigned to the inlet spiral, however, a flow direction with at least one axial component is superimposed on this flow direction. As a result, the fluid arrives in the hydrodynamic circuit at a comparatively low flow velocity. This solution is supported by the appropriate specification of a width of the flow route which remains to the fluid for entry into the hydrodynamic circuit, and which can be reduced, if desired, to a slit. Using a slit, an additional throttling effect on the flowing fluid is obtained.

Preferably the flow guide is provided as an axial projection on the base body of a blade wheel, preferably the stator blade wheel, and projects beyond the external contour of this blade wheel toward the other blade wheel, such as the rotor blade wheel. As a result, the fluid is guided into the hydrodynamic circuit far past the blades of the stator blade wheel most at risk and is thus unable to cause any damage due to cavitation. By providing the flow guide with an appropriate design, it is also possible to superimpose a component in the radial direction on the movement of the fluid, so that it can enter the hydrodynamic circuit without any pronounced deflections and thus in an essentially laminar fashion.

The flow guide, designed in concrete terms as an axial projection on the stator blade wheel projecting toward the other blade wheel, can penetrate into the external contour of the other blade wheel, i.e., the rotor blade wheel. For this reason, the latter is designed with a setback, preferably in the area of the blading, because as a result the laminar flow is introduced directly into the blading of this rotor and into the hydrodynamic circuit.

As called for by the requirements in question, the fluid also leaves at least essentially in the tangential direction, namely, through an outlet spiral. The outlet spiral is preferably provided radially outside the hydrodynamic circuit, whereas the inlet spiral is provided radially inside the hydrodynamic circuit.

BRIEF DESCRIPTION OF DRAWINGS

The invention is explained in greater detail below on the basis of an exemplary embodiment:

FIG. 1 is the upper half of a longitudinal cross section through a hydrodynamic retarder with a rotor blade wheel and a stator blade wheel.

DETAILED DESCRIPTION OF DRAWINGS

FIG. 1 is a hydrodynamic retarder, which is centered on an axis 90. The retarder has a nonrotatable retarder carrier 1 in a transmission housing (not shown); the carrier radially encloses a support element 3, which is also nonrotatable. Via a radial bearing 11, the support element 3 is also encircled by a clutch hub 5 of a clutch unit 7, which has a clutch housing 9 and is connected nonrotatably in a manner not shown to a transmission input shaft (also not shown). As a result of this connection, the clutch unit 7 and thus the clutch housing 9 participate in the rotational movement of the transmission input shaft.

To return to the clutch hub 5 of the clutch unit 7: the clutch 5 hub engages by a set of teeth 13 with a rotor hub 15 of the retarder. The rotor hub 15 is supported axially on the side facing away from the clutch unit 7 by an axial bearing 17 in the support element 3. The rotor hub 15 is attached to a base body 19 serving as a rotor shell 20, which base body, proceeding from the rotor hub 15, extends radially outward and holds, in the radially outer area, a blading 21 with a plurality of blades 23, thus forming a first blade wheel in the form of a rotor blade wheel 25. The rotor blade wheel 25 cooperates with a second blade wheel in the form of a stator blade wheel 27 of the retarder, which also has a base body 29, which acts as a stator shell 31 and serves to hold a blading 33 with blades 35. On the side of the stator shell 31 facing away from the rotor blade wheel 25, threaded sleeves 39, distributed around the circumference, are provided, into each of which a fastening element 37 can be introduced, wherein the stator blade wheel 27 is attached to the retarder carrier 1 by the fastening elements 37 in cooperation with the threaded sleeves 39.

The rotor blade wheel 25 cooperates with the stator blade wheel 27 to form a hydrodynamic circuit 41, which is at least partially filled with viscous medium. The degree to which the hydrodynamic circuit 41 is filled can be increased through a fluid inlet 43, whereas the viscous medium can be discharged from the hydrodynamic circuit 41 through a fluid outlet 45. In the known manner, the degree to which the hydrodynamic circuit 41 can transmit torque and thus the intensity of the braking action produced by the retarder is adjusted by the degree to which the circuit 41 is filled. The fluid inlet 43 thus serves in cooperation with the fluid outlet 45 to regulate the retarder.

The fluid inlet 43 is provided radially inside the hydrodynamic circuit 41 and is designed in the form of an inlet spiral 110. This inlet spiral 110 causes the fluid which is introduced through the fluid inlet 43 to form a fluid flow 126, which flows in the circumferential direction, as indicated by the flow arrow designated by reference number 126. By of an axial projection 118, which is provided on the radially inside part of the base body 31 of the stator blade wheel 28 and which projects beyond the external contour of the stator blade wheel 27 toward the rotor blade wheel 25, a flow guide 114 is assigned to the stator blade wheel 27. By this flow guide 114, a component in the radial direction is superimposed on the fluid flow 126 arriving from the inlet spiral 110 in an essentially tangential manner. The fluid flow 126 is thus introduced directly into the rotor blade wheel 25 and thus into the hydrodynamic circuit 41.

To create space in the area of the rotor blade wheel 25 to allow the penetration of the flow guide 114, the blades 23 of the rotor blade wheel 25 are each provided with a setback 124 in the radial area where the free axial end 122 of the axial projection 118 of the flow guide 114 projects. A recess 120 for the axial projection 118 of the flow guide 114 is thus formed all the way around the entire blading 21 of the rotor blade wheel 25.

A flow route 116 for the fluid flow 126 that allows the flow to enter the hydrodynamic circuit 41 is formed between the rotor shell 20 of the rotor blade wheel 25 and the free axial end 122 of the axial projection 118. This flow route 116 can be narrowed down to the width of a slit.

The fluid that leaves the hydrodynamic circuit 41 enters an outlet spiral 112 provided radially outside the hydrodynamic circuit 41. This outlet spiral 112 is assigned to the fluid outlet 45. The fluid carried away from the hydrodynamic circuit 41 forms a fluid flow 128 proceeding in the circumferential direction, as indicated by the flow arrow designated by the reference number 128. The fluid thus flows inside the outlet spiral 112 in a direction at least essentially tangential to the hydrodynamic circuit 41.

To return to the base body 19 of the rotor blade wheel 25: a pressure equalizer 47 in the form of at least one throughbore is formed in it. By this pressure equalizer 47, the hydrodynamic circuit 41 is connected to a compensating space 49, which is located axially between the base body 19 of the rotor blade wheel 25 and a sealing flange 51, which is attached by fastening elements 53 to the retarder carrier 1. Before the structural design of this sealing flange 51 is discussed, the function of the compensating space 49 is to be explained briefly, which, because of the pressure equalizer 47, has pressure conditions similar to those of the hydrodynamic circuit 41, which means that the base body 19 of the rotor blade wheel 25 is prevented from being subjected to severe loads on the side facing the hydrodynamic circuit 41.

In the radially inner area, the sealing flange 51 comprises an axially oriented mounting projection 55 pointing essentially in the direction toward the rotor blade wheel 25. An annular spring seal 57 is provided on this projection. A first side piece 59 of this seal grips behind a radial lobe 63 provided on the mounting projection 55, and a second side piece 61 grips behind the radially opposing side of the mounting projection 55. Thus mounted both axially and radially on the sealing flange 51, the annular spring seal 57 exerts pressure by way of its bottom surface 65 on the clutch hub 5. To guarantee a satisfactory seal at this contact point between the stationary sealing flange 51 and the rotating clutch unit 7, a sealing ring 67 is inserted into a groove 69 in the clutch hub 5; this sealing ring 67 and preferably also the groove 69 are rectangular in cross section. The sealing ring 67 consists preferably of gray cast iron, but alternatively it can be produced out of an elastomeric material. A lubricating bore 71, is formed in the clutch hub 5 and extends essentially in the radial direction, is assigned to the sealing ring 67.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A hydrodynamic retarder comprising:
   a first blade wheel comprising a first base body and a plurality of first blades permanently attached to the first base body; and
   a second blade wheel comprising a second base body and a plurality of second blades permanently attached to the second base body, the second blade wheel being concentric to the first blade wheel, the first and second blade wheels configured to form a hydrodynamic circuit and arranged around a common axis of rotation;
   a fluid inlet configured to supply fluid to the hydrodynamic circuit, the fluid inlet comprising an inlet spiral configured to create a tangential fluid flow;
   a fluid outlet configured to discharge fluid from the hydrodynamic circuit, the fluid outlet comprising an outlet spiral configured to create a tangential fluid flow; and
   a flow guide configured to introduce the fluid into the hydrodynamic circuit comprising at least one axial component assigned at least to the inlet spiral,
   wherein the inlet spiral is arranged radially inside the hydrodynamic circuit and the outlet spiral is arranged radially outside the hydrodynamic circuit,
   wherein the flow guide is provided as an axial projection on the first base body and projects beyond the external contour of the first blade wheel toward the second blade wheel, the axial projection configured to engage in a recess in the second blade wheel,
   wherein the flow guide is configured as a stator blade wheel and the second base body is configured as a rotor blade wheel, and
   the flow guide is configured to engage in the recess in the rotor blade wheel
   wherein the first base body has an arcuate contour and the axial projection continues the arcuate contour so that the axial projection projects away from the axis of rotation.

2. The hydrodynamic retarder according to claim 1, wherein the flow guide defines a flow route between the inlet spiral and the hydrodynamic circuit, and the inlet spiral is separated from the hydrodynamic circuit by the flow guide except for the width of the flow route.

3. The hydrodynamic retarder according to claim 2, wherein the width of the flow route is configured to be reduced to a slit.

4. The hydrodynamic retarder according to claim 1, wherein the axial projection of the first base body is provided in a radially inner area of the first base body with a free axial end of the axial projection configured to approach the second blade wheel to form a flow path.

5. The hydrodynamic retarder according to claim 4, wherein the axial projection of the flow guide on the first base body comprises an extension extending in a radial direction configured so that the direction of the fluid flow coming from the inlet spiral has a component in the radial direction.

6. The hydrodynamic retarder according to claim 1, wherein the blading of the second blade wheel, is provided with a setback in the individual blades, which forms the recess in the area of the radial extension of a free axial end of the axial projection.

* * * * *